Feb. 12, 1952 R. H. HERMAN 2,585,315
LAWN MOWER
Filed April 18, 1949 2 SHEETS—SHEET 2

INVENTOR.
Rudolph H. Herman
BY
ATTORNEY.

Patented Feb. 12, 1952

2,585,315

UNITED STATES PATENT OFFICE 2,585,315

LAWN MOWER

Rudolph H. Herman, Kansas City, Mo., assignor of one-half to Arthur Popham, Jr., Kansas City, Mo.

Application April 18, 1949, Serial No. 88,215

4 Claims. (Cl. 180—6.2)

This invention relates to a readily removable attachment for conventional lawn mowers of the kind having a pair of opposed ground wheels and a cutting assembly rotatably mounted therebetween, the primary object being to provide as a part of such attachment, structure adapted to be connected with said wheels to drive the same and having novel control means that are simple to operate and particularly safe in such operation.

It is the most important object of the present invention to provide an attachment for lawn mowers of the kind above specified having thereon a rotatable shaft that is joined with the wheels of the mower through endless belts, the shaft being reciprocably mounted for movement to and from a position slackening the belts and having manual control means therefor, whereby the interconnection between the shaft and the wheels may be rendered inoperable as desired.

Another important object of the present invention is to provide a drive assembly for lawn mowers wherein the rotatable shaft thereof is separably mounted at each end thereof for movement toward and away from the wheels to be driven, and yieldably held in a position with the drive belts under tension, there being a specially formed handle operably connected with the shaft for shifting the same and thereby rendering the assembly inoperable from the standpoint of the driving of the mower wheels.

A still further object of the present invention is to provide manual control means for actuating the rotatable drive shaft, embodied within a handle and so formed as to disengage pulleys on the shaft with respect to their belts when the handle of the lawn mower is released and to reestablish operable connection when the handle is raised to a normal guiding position.

Other objects of the present invention relate to the manner in which a pair of swingable hand grips is provided on the handle and so connected with the reciprocable shaft as to effect turning of the mower when placed in use; the way in which the handle itself is articulated intermediate the ends thereof to permit buckling during storage of the mower; the manner of reciprocably mounting the prime mover and yieldably holding the same in a position where its drive belt is held taut; and the way in which the entire attachment is formed and mounted on the mower itself so as to be readily detached for rendering the mower usable in the conventional manner.

Other more minor objects including details of construction, will be made clear as the following specification progresses, reference being had to the accompanying drawing, wherein:

Fig. 3 is a transverse, cross-sectional view taken on line III—III of Fig. 1 looking in the direction of the arrows.

Fig. 4 is a fragmentary, detailed, cross-sectional view taken on line IV—IV of Fig. 1.

Figure 1:
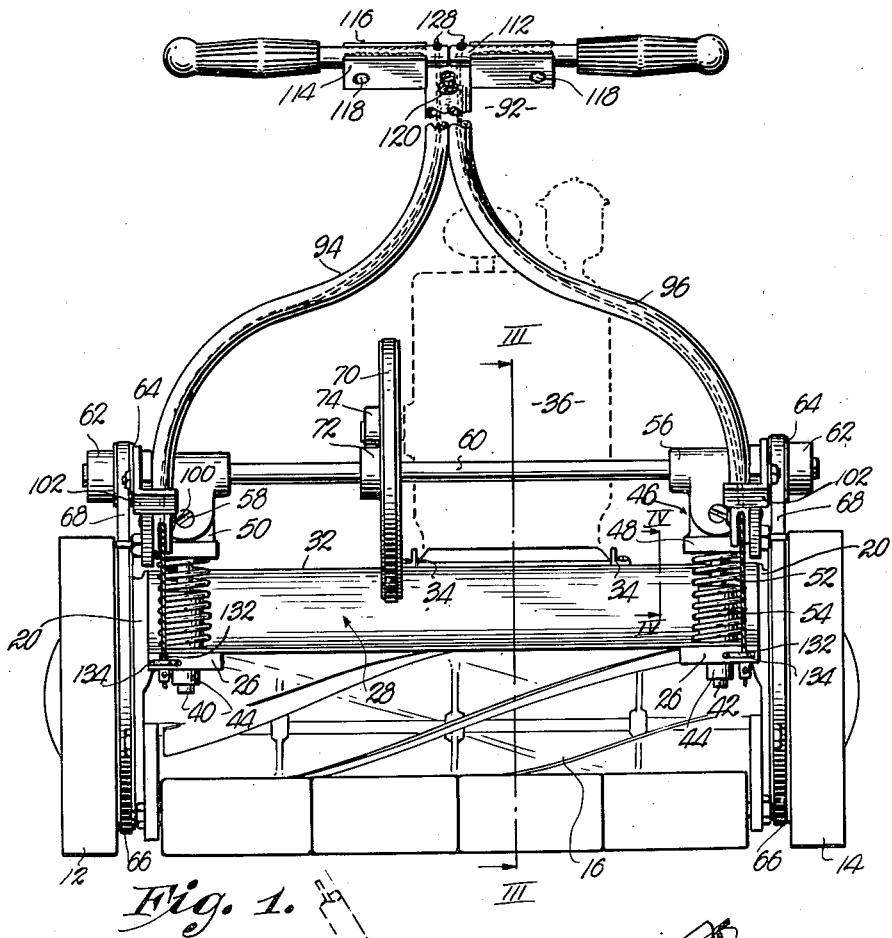
Figure 1 is a rear elevational view of a lawn mower made in accordance with my present invention.

There is illustrated in the drawings a conventional lawn mower of the kind having a frame broadly designated by the numeral 10 upon which frame 10 is rotatably mounted a pair of spaced apart supporting wheels 12 and 14. The wheels 12 and 14 are operably connected with a cutter blade assembly 16 that is mounted on the frame 10 between wheels 12 and 14 for rotation on a substantially horizontal axis. The blades of the assembly 16 cooperate with a rigid blade 18 on frame 10 in the severing action of the mower.

The lawn mower chosen for illustration, has its frame 10 provided with opposed integral circular portions 20 and it is upon these portions 20 that the attachment hereof is releasably mounted.

A pair of elongated arms 22 and 24 of identical character are formed arcuately at the bottom thereof and adjacent one of their ends to conform with the contour of the portions 20 of the frame 10, there being an arm for each portion 20 respectively. The arms 22 and 24 rest directly upon the frame portions 20 as illustrated most clearly in Fig. 4 and extend rearwardly and downwardly into a projection 26.

The two spaced apart arms 22 and 24 are interconnected by a plate 28 through the medium of screws or the like 30, said plate 28 conforming in transverse cross-section with the contour of the uppermost edge of the arms 22 and 24. Consequently, a flat face 32 is presented in the plate 28 that overlies the cutting assembly 16. This face 32 carries a pair of spaced apart guides 34 extending transversely of the plate 28 for receiving a small gasoline engine or other prime mover 36.

Plate 28 is held in place upon the frame portions 20 through the medium of a central pin 38 that projects downwardly through the plate 28 and each arm 24 and 26 respectively and into an opening provided in the corresponding frame portion 20. That portion of the plate 28 overlying the projections 26 of the arms 22 and 24, is provided with a pair of spaced apart openings adjacent the ends thereof for reciprocably receiving vertical pins 40 and 42 respectively.

The lowermost ends of the pins 40 and 42 are provided with collars 44 underlying the plate 28 for limiting the extent of upward movement of the pins 40 and 42.

A universal joint 46 is provided at the uppermost end of each pin 40 and 42 respectively. Joint 46 includes a section 48 having a perforated upstanding ear 50 and joined directly to the uppermost end of the corresponding pin 40 or 42 as the case may be.

A spring 52 is coiled about a collar 54 that in turn circumscribes the pin 40 or 42. One end of the spring 52 bears against the uppermost face of the plate 28 and the opposite end thereof bears against the section 48 of universal joint 46.

Another section 56 of the joints 46 is bifurcated for receiving the ear 50 of the section 48 and a transverse bolt 58 pivotally interconnects the sections 48 and 56. The sections 56 of the two joints 46 are formed to present bearings for rotatably receiving the horizontal shaft 60 that spans the distance between the sections 56 and is disposed horizontally in spaced relationship above the plate 28. Collars 62 on the ends of the shafts 60 maintain the same in place.

A pulley 64 is interposed between each collar 62 respectively and the corresponding joint section 56, the pulleys 64 being secured directly to the shaft 60.

A sheave 66 is secured directly to the innermost face of each wheel 12 and 14 respectively for receiving an endless belt 68 that is in turn trained about the corresponding pulley 64. Rotative movement is imparted to the shaft 60 from the prime mover 36 through the medium of an endless belt 70 that passes over a pulley 72 secured to shaft 60 intermediate the ends thereof, which belt 70 also passes over a small pulley 74 on the drive shaft of the prime mover 36.

A base plate 76 for the prime mover 36 is freely slidable upon the uppermost face 32 of plate 28 between the guides 34.

An L-shaped pin 78 reciprocably mounted in a bracket 80 depending from the plate 28, has a spring 82 coiled thereabout and held against the bracket 80 by a collar 84. Pin 78 passes through an opening 86 that supports the outermost end thereof and the short leg 88 of pin 78 extends upwardly and into an opening 90 formed in the base member 76. Consequently, the belt 70 is yieldably held in a tight condition between pulleys 72 and 74 through the action of the spring 82.

A handle, broadly designated by the numeral 92, has a pair of tubular stretches 94 and 96 that converge and join as the outermost free ends thereof are approached. Each of the sections 94 and 96 respectively of the handle 92 is provided with an extension 98 at the innermost end thereof and pivotally secured thereto through the medium of a pin 100. The sections 94 and 96 are free to swing upwardly with respect to their extensions 98 but an L-shaped bracket 102 adjustably secured to the extensions 98 have one leg thereof underlying the sections 94 or 96 as the case may be, to limit downward movement of the handle 92 with respect to the extensions 98. The extensions 98 are pivotally connected as at 104 intermediate the ends thereof to a corresponding portion 48 of the universal joints 46. That end of the extensions 98 opposite to the handle 92 pivotally receives one leg of a U-shaped link 106, the other leg thereof being pivotally secured to a boss 108 on the plate 28.

The outermost and uppermost ends of the sections 94 and 96 of handle 92, are out-turned as at 110 and each of the out-turned ends 110 is provided with a grip member 112 having a pair of spaced apart plates 114 and 116 that overlap the end 110. The plates 114 and 116 are pivotally joined through the medium of a pin 118 to the outermost free end of the portions 110 of handle 92 for free swinging movement of the grips 112 in the manner illustrated by dotted lines in Fig. 5.

A spring-loaded pin 120 carried by the handle 92 for reciprocable movement therein is provided with a pair of L-shaped arms 122 that pass through aligned openings 124 and 126 in plates 114 and 116 and in the end portions 110 respectively. As the arms 122 are removed from the openings 124 and 126, they are turned to an inoperative position rendering the grips 112 freely swingable. The innermost end of the grips 112 have secured thereto one end of a cable 128 that passes downwardly through a corresponding handle section 94 and 96 over a pin 130 adjacent the innermost ends of the handle sections 94 and 96 and thence outwardly and downwardly for connection with the plate 28. The rearmost edge of the plate 28 and the arms 22 and 24 are provided with slots 132 for receiving the cables 128 and a spring catch 134 yieldably holds the cables 128 in place within the slots 132. Removal of the cables from slots 132 against the action of spring catches 134, permits removal of handle 92 from pins 100 by springing 94 and 96 toward each other.

Figure 2:
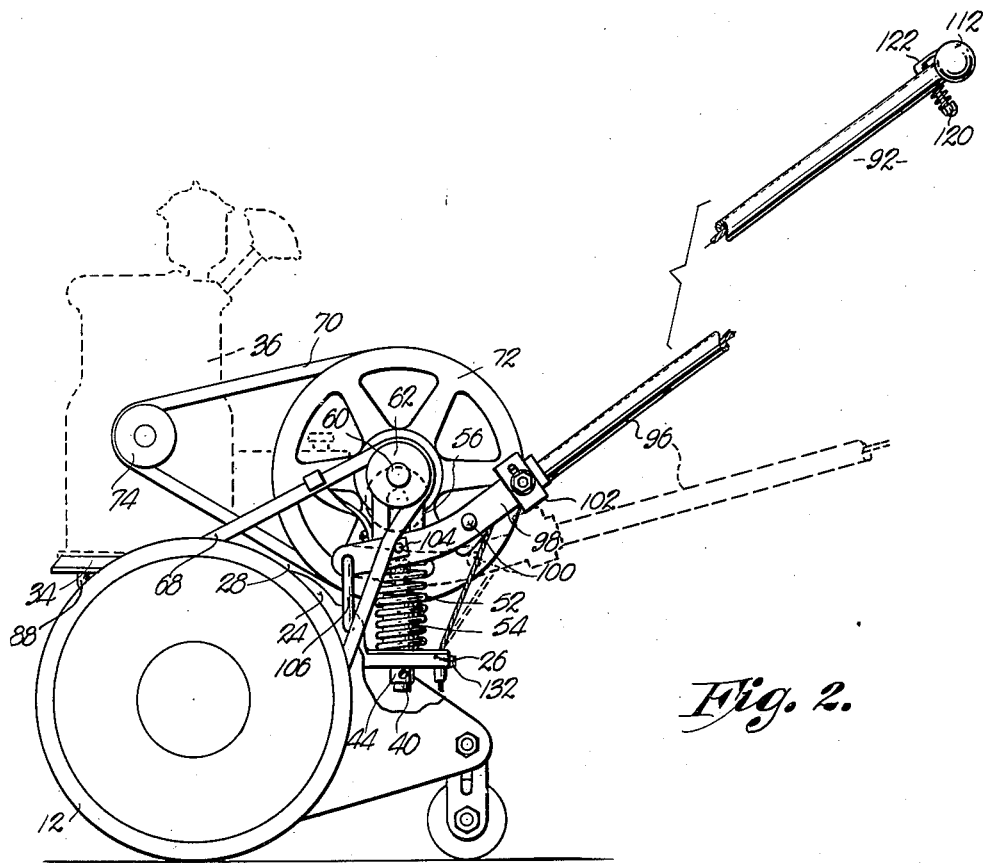
Fig. 2 is a side elevational view thereof.

In operation, when the drive shaft 60 is at the uppermost end of its path of travel, and yieldably held in such position by the action of the two springs 52, the two endless belts 68 are taut and, therefore, in a condition for driving the wheels 12 and 14 upon energization of the prime mover 36. (Full lines, Figs. 1, 2, 3.) Obviously, downward movement of the shaft 60 and the pulleys 64 thereon will cause the two belts 68 to slacken and the pulleys 64 will thereby rotate freely within the belts 68 without imparting rotative movement to the wheels 12 and 14. Downward movement of the shaft 60 to thus render the prime mover 36 inoperable to drive wheels 12 and 14, is accomplished by simply releasing the handle 92, the weight of such handle 92 and its component parts being sufficient to overcome the action of springs 52. (See Fig. 2, dash lines.)

When the operator desires to place the machine in operation, he merely lifts upwardly on the outermost end of the handle 92, which raises the shaft 60 with the aid of springs 52, thereby placing the belts 68 under tension. (See Figs. 2 and 3, full lines.)

Figure 5:
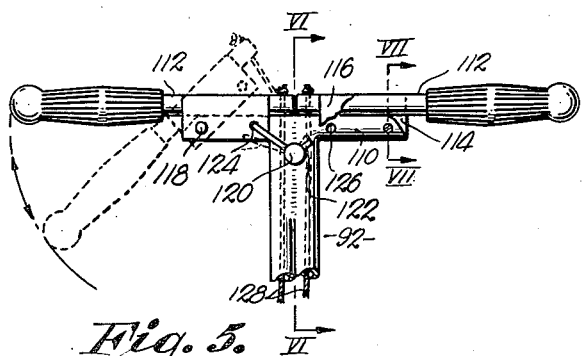
Fig. 5 is a fragmentary, top plan view of the outermost end of the handle per se of the mower, parts being broken away to reveal details of construction.
Figure 6:
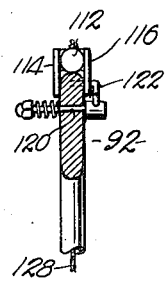
Fig. 6 is a transverse cross-sectional view taken on line VI—VI of Fig. 5.
Figure 7:
Fig. 7 is a cross-sectional view taken on line VII—VII of Fig. 5.

If it is desired to turn the mower while the same is moving forwardly under power of prime mover 36, the operator presses downwardly upon one of the grip members 112 as shown by the arrows in Fig. 5, to thereby pull upon one of the cables 128. Such action compresses the correesponding spring 52 and lowers one end only of the shaft 60. (See Fig. 3, dash lines.) Obviously the fit between sections 94 and 96 and the pins 100 is not so tight as to present lateral swinging of the sections 94 and 96 toward and away from extensions 98 during manipulation of but one handle 112.

The pulley 64 on the opposite end of the shaft 60 will remain under tension with respect to its belt 68 and, therefore, the corresponding drive wheel of the mower will continue to be driven. The lawn mower wheel that is disconnected with respect to the prime mover 36 will thereupon swing on a given point while the turning action takes place. The articulation between handle sections 94 and 96 and their extensions 98 permits simple storage of the mower in confined places by swinging handle 92 to the dotted line position of Fig. 3.

It has been found that the operator can soon learn to manipulate the mower whereby to impart reciprocating motion thereto by proper lifting and lowering of the handle 92. As a safety factor in the event that for any reason the operator becomes incapacitated, the mere release of the handle 92 will disengage the pulleys 64 and thereby render the driving assembly inoperable. Furthermore, it is to be noted that simultaneous downward swinging movement of the grips 112 will also render the assembly inoperable.

Another novel feature that is quite important to the present invention lies in the way in which the entire assembly is mounted upon the plate 28 which may be easily removed from the frame portions 20 after release of the belts 68.

Having thus described the invention, what is claimed as new and desired to be secured by Letters Patent is:

1. In a lawn mower, the combination of a shaft; pulleys on the shaft; belts for driving the lawn mower wheels from the pulleys; shiftable shaft-supporting means including yieldable elements arranged to push the ends of the shaft so as to maintain the belts taut; and a guide handle movably carried by said lawn mower and operably connected with said means for shifting said shaft against the action of said elements to simultaneously loosen the belts when the handle is moved toward one end of its path of travel.

2. In a lawn mower, the combination of a shaft; pulleys on the shaft; belts for driving the lawn mower wheels from the pulleys; shiftable shaft-supporting means including yieldable elements arranged to push the ends of the shaft so as to maintain the belts taut, and permit the shaft to tilt from end to end; a guide handle on the lawn mower; a pair of grips movable on the handle; and means operably connecting each grip respectively with a corresponding shaft-supporting means for shifting the latter against the action of the corresponding yieldable element to selectively tilt the shaft in opposite directions as the grips are alternately moved to one end of their respective paths of travel.

3. In a lawn mower having a shaft, pulleys on the shaft, belts for driving the lawn mower wheels from the pulleys, and shiftable shaft-supporting means, including yieldable elements arranged to push the ends of the shaft so as to maintain the belts taut, the improvement of which comprises a guiding handle movably carried by said lawn mower and operably connected with said means for shifting said shaft against the action of said elements to simultaneously loosen the belts when the handle is moved toward one end of its path of travel.

4. In a lawn mower having a shaft, pulleys on the shaft, belts for driving the lawn mower wheels from the pulleys, and shiftable shaft-supporting means, including yieldable elements arranged to push the ends of the shaft so as to maintain the belts taut, and permit the shaft to tilt from end to end, the improvement of which comprises a guiding handle movably carried by said lawn mower and operably connected with said means for shifting said shaft against the action of said elements to simultaneously loosen the belts when the handle is moved toward one end of its path of travel; a pair of grips movable on the handle; and means operably connecting each grip respectively with a corresponding shaft-supporting means for shifting the latter against the action of the corresponding yieldable element to selectively tilt the shaft in opposite directions as the grips are alternately moved to one end of their respective paths of travel.

RUDOLPH H. HERMAN.

REFERENCES CITED

The following references are of record in the file of this patent:

UNITED STATES PATENTS

| Number | Name | Date |
| --- | --- | --- |
| 1,779,583 | Blydenburgh | Oct. 28, 1930 |
| 2,073,158 | Kindle et al. | Mar. 9, 1937 |
| 2,237,521 | Frazier | Apr. 8, 1941 |
| 2,329,372 | Hitch | Sept. 14, 1943 |
| 2,528,244 | Rawson | Oct. 31, 1950 |